United States Patent Office 3,551,565
Patented Dec. 29, 1970

3,551,565
PHARMACEUTICAL COMPOSITIONS AND USES OF OXAZINOISOQUINOLINE DERIVATIVES
Frank H. Clarke, Jr., Armonk, N.Y., assignor to Geigy Chemical Corporation, Ardsley, N.Y., a corporation of New York
No Drawing. Application Apr. 26, 1968, Ser. No. 724,622, now Patent No. 3,470,171, dated Sept. 30, 1969, which is a continuation-in-part of application Ser. No. 634,856, May 1, 1967. Divided and this application Feb. 18, 1969, Ser. No. 825,467
Int. Cl. A61k 27/00
U.S. Cl. 424—248
21 Claims

ABSTRACT OF THE DISCLOSURE 3-carboxamido, and substituted carboxamido, derivatives of 9,10-dialkoxy-, 9,10,11-trialkoxy-, and 9,10-methylenedioxy - 1,3,4,6,7,11b - hexahydro - [1,4]oxazino [3,4a]isoquinolines, and their salts, possess tranquilizing and muscle relaxant properties. They can be prepared through treatment of derivatives of the corresponding 3-carboxylic acid with an amine. Typical embodiments are 3-carboxamido - 9,10 - dimethoxy - 1,3,4,6,7,11b-hexahydro - [1,4]oxazino[3,4a]isoquinoline and 3 - (N,N-diethylcarboxamido)-9,10-dimethoxy - 1,3,4,6,7,11b - hexahydro-[1,4]oxazino[3,4a]isoquinoline.

CROSS REFERENCE

This is a division of Ser. No. 724,622, filed Apr. 26, 1968, now U.S. Pat. No. 3,470,171, which in turn is a continuation-in-part of copending application Ser. No. 634,856, filed May 1, 1967, now abandoned.

DETAILED DESCRIPTION

The present invention pertains to novel derivatives of [1,4]oxazino[3,4]isoquinolines, to methods for their preparation and use, and to intermediates useful in their preparation.

In particular, the present invention pertains to processes for the preparation of compounds, and to the compounds themselves, of the formula:

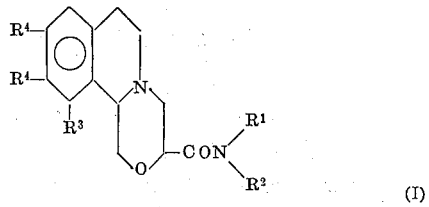

(I)

wherein
each of $R^1$ and $R^2$ taken independently is hydrogen or (lower)alkyl and $R^1$ and $R^2$ taken together with the nitrogen atom to which they are attached are morpholino, piperidino, pyrrolidino, piperazino, N'-[(lower)-alkyl]piperazino, N'-[hydroxy(lower)alkyl]piperazino, or N'-[(lower)alkoxy(lower)alkyl]piperazino;
$R^3$ is hydrogen or (lower)alkoxy; and
each of $R^4$ and $R^5$ taken independently is (lower)alkoxy or $R^4$ and $R^5$ taken together when $R^3$ is hydrogen are methylenedioxy; and the pharmaceutically acceptable acid addition salts thereof with organic and inorganic acids.

By the term "(lower) alkyl" and derivations thereof utilizing the root "alk," such as "(lower alkoxy," (lower) alkanoyloxy," and the like is intended unless otherwise qualified, a group comprising a branched or straight hydrocarbon chain containing from one to six carbon atoms. Representative of (lower)alkyl groups are thus methyl, ethyl, propyl, i-proply, butyl, s-butyl, t-butyl, pentyl, ispentyl, hexyl and the like. Embraced by lower alkoxy are groups containing from one to six carbon atoms and joined through an oxygen ether bond, such as methoxy, ethoxy, i-propoxy, butoxy and the like. It is to be understood that when the nature of any particular functional group in these moieties requires two carbon atoms, the hydrocarbon portion of the moiety will have from two to seven carbon atoms. Thus "(lower)alkanoyloxy" is typified by acetoxy, propanoyloxy, butanoyloxy, pentanoyloxy, hexanoyloxy and the like.

With greater particularity to Formula I, the compounds of the present invention are named in accordance with the conventions of Chemical Abstracts as derivatives of [1,4]-oxaziono[3,4a]isoquinoline, the nucleus of which is represented and numbered as follows:

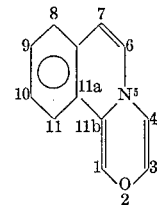

(II)

The novel compounds of the present invention are thus derivatives of 1,3,4,6,11b - hexahydro - [1,4]oxazino-[3,4a]isoquinolines.

The compounds of the present invention are either unsubstituted or substituted by a (lower)alkoxy group, preferably methoxy, in the 11 position and substituted by (lower)alkoxy groups, preferably methoxy, in the 9 and 10 positions. Alternatively when unsubstituted in the 11 position, there can be a methylenedioxy group bridging the 9 and 10 positions. Preferred species are those which are disubstituted by methoxy in the 9 and 10 positions.

A carboxamido group is in the 3-position of the compounds of the present invention. The amido group may be unsubstituted [$R^1$ and $R^2$=hydrogen], monosubstituted by a (lower)alkyl group [$R^1$=hydrogen, $R^2$=(lower)alkyl, disubstituted by (lower)alkyl ($R^1$=(lower)alkyl, $R^2$=(lower alkyl], or disubstituted by a cyclic structure so that, together with the nitrogen atom, a heterocyclic group such as morpholino, piperazino, piperidino, pyrrolidino or the like is present.

The 3 - carboxamido-1,3,4,6,7,11b-hexahydro-[1,4]-oxazino[3,4a]isoquinolines of the present invention, namely those of Formula 1, possess tranquilizing and muscle relaxing properties. They are accordingly useful in combatting agitation and hyperactivity in animals, in preoperative treatment and in the treatment of anxiety, tension and apprehension occurring alone or in association with various physiological disorders. These compounds advantageously have a high therapeutic index and do not appear to deplete norepinephine at normal dosage levels. Generally the compounds are administered at levels of from about 5 to about 75 mg./kg. of body weight although as with any agent of this type, the dose will vary depending upon the patient and condition.

The tranquilizing and muscle relaxant properties of these compounds can be conveniently observed in a variety of standard tests which are correlated pharmacologically with specific therapeutic responses. For example, tranquilizing action is observed in the Mouse Reflex Test in which for these compounds the ratios of the dose required to effect prehensile reflex blocking to the dose required to effect traction blocking are greater than 3. In the chloralose anesthetized cat with spinal column severed at the first cervical vertebra, depression of the polysynaptic reflexes (linguo-mandibular and flexor) upon electric stimulation is observed for at least four hours at a dose of 20 mg./kg. i.v., a pattern characteristic of a central muscle relaxant. A typical neuroleptic response is observed in the Sidman Avoicance Test in gerbils. In the wild red fox, the compounds are qualitatively similar to chlordiazepoxide. In the monkey they cause reduced activity and friendly behavior without ataxia.

These compounds can be administered parenterally or orally, preferably the latter, in any of the usual pharmaceutical forms including tablets, capsules, powders, suspensions, solutions, syrups and the like, including sustained release preparations which may be compounded by any of the known procedures. The compounds of the present invention are incorporated in compositions suitable for oral administration in solid and liquid unit dosage forms, standard modes of administration being employed. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methylcellulose, and a polish coating of carnauba wax may be provided. Dyestuffs can be added to these coatings to distinguish different unit dosages.

For parenteral administration, fluid unit dosage forms can be prepared by suspending or dissolving a measured amount of the compound in a non-toxic liquid vehicle suitable for injection.

One important embodiment of the present invention is the acid addition salts of the compounds of Formula I which are derived from pharmaceutically acceptable non-toxic acids. Such pharmaceutically acceptable non-toxic salts include those derived from both organic and inorganic acids such as, without limitation, hydrochloric, hydrobromic, sulfuric, phosphoric, methanesulfonic, acetic, lactic, succinic, malic, maleic, aconitis, phthalic, tartaric, embonic and like acids.

The presence of asymmetric substitution on the 3- and 11b-carbon atoms permits the existence of four isomeric forms. These correspond to the two enantiomorphs of the stereoisomer wherein the hydrogen atoms in positions 3 and 11b are in the cis relationships and the two enantiomorphs of the stereoisomer wherein these hydrogen atoms are in the trans relationship. Two such stereoisomeric racemates have been obtained and arbitrarily designated isomer I and isomer II, it being believed on the basis of present studies that isomer I corresponds to cis and isomer II corresponds to trans. Isomer I can be rearranged to the more stable isomer II through the action of strong base. The two pairs of enantiomorphs, i.e. the mixture of racemic isomer I and racemic isomer II, are separable into the individual racemates through fractional crystallization, chromatography or the like by reason of their different physical properties while the individual enantiomorphs of each pair are separated through the use of optically active acids according to conventional techniques. All such isomeric forms are within the purview of the present invention.

The oxazinoisoquinoline derivatives utilized in the present invention can be prepared in accordance with the procedures described in U.S. Pat. No. 3,370,171, the disclosure of which is hereby incorporated by reference.

The following examples will serve to further typify the nature of the present invention but should not be construed as a limitation on the scope thereof.

EXAMPLE 1

Typical of the compounds of the present invention, the synthesis of which is described in U.S. Pat. No. 3,470,171, are 3-(N,N-diethyl - carboxamido) - 9,10 - dimethoxy - 1,3,4,6,7,11b - hexahydro[1,4]oxazino[3,4,a]isoquinoline, 3 - (N,N - diethylcarboxamido) - 9,10 - methylenedioxy - 1,3,4,6,11b - hexahydro - [1,4]oxazino[3,4a]isoquinoline, 3-(N,N-diethylcarboxamido) - 9,10,11 - trimethoxy-1,3,4,6,7,11b - hexahydro - [1,4]oxazino[3,4a]isoquinoline, 3 - carboxamido - 9,10 - dimethoxy - 1,3,4,6,7,11b - hexahydro - [1,4]oxazino [3,4a]isoquinoline, 3 - carboxamido - 9,10,11 - trimethoxy - 1,3,4,6,7,11b - hexahydro[1,4] oxazino - [3,4a]isoquinoline, 3 - carboxamido - 9,10 - methylenedioxy - 1,3,4,6,7,11b-hexahydro - [1,4]oxazino [3,4a]isoquinoline, 3 - (N - ethylcarboxamido) - 9,10 - dimethoxy - 1,3,4,6,7,11b - hexahydro - [1,4]oxazino [3,4a]isoquinoline, 3 - piperidinocarbonyl - 9,10 - dimethoxy - 1,3,4,6,7,11b - hexahydro - [1,4]oxazino[3,4a] isoquinoline, 3 - morpholinocarbonyl - 9,10 - dimethoxy - 1,3,4,6,7,11b - hexahydro - [1,4]oxazino[3,4a]isoquinoline, 3 - pyrrolidinocarbonyl - 9,10 - dimethoxy - 1,3,4,6,7,11b-hexahydro - [1,4]oxazino[3,4a]isoquinoline, 3-(N'-methylpiperazinocarbonyl) - 9,10 - dimethoxy - 1,3,4,6,7,11b - hexahydro - [1,4]oxazino[3,4a]isoquinoline, 3-[N'-(2 - hydroxyethyl) - piperazinocarbonyl] - 9,10 - dimethoxy - 1,3,4,6,7,11b - hexahydro - [1,4] - oxazino [3,4a] isoquinoline, M.P. and 3 - piperazinocarbonyl - 9,10 - dimethoxy - 1,3,4,6,7,11 - bhexahydro - [1,4]oxazino [3,4a] isoquinoline.

EXAMPLE 2

A solution of 6.95 g. of 3-(N,N-diethylcarboxamido)- 9,10 - dimethoxy - 1,3,4,6,7,11b - hexahydro - [1,4]oxazino[3,4a]-isoquinoline in hot methanol is treated with 2.4 g. of maleic acid dissolved in the same solvent. Concentration and cooling causes precipitation of the maleate salt which is collected by filtration.

Other salts such as the tartrate, succinate, citrate and the like are prepared in a similar manner.

EXAMPLE 3

Optical resolution of racemic 3-(N,N-diethylcarboxamido) - 9,10 - dimethoxy - 1,3,4,6,7,11b - hexahydro- [1,4]-oxazino[3,4a]isoquinoline A solution of 11.55 g. of racemic 3-(N,N-diethylcarboxamido)9,10 - dimethoxy - 1,3,4,6,7,11b - hexahydro- [1,4]oxazino[3,4a]isoquinoline, M.P. 121–124° C., and 4.443 g. of (−)-malic acid in 50 ml. of isopropanol is prepared by heating the components together. This solution is allowed to stand at room temperature for 18 hours after which time the crystals are collected by filtration, washed with a little cold isopropanol and dried in vacuo at 40° C. The material so obtained is recrystallized from isopropanol to yield the (−)-malate of the (−)-base as colorless prisms, M.P. 91–96° C., $[\alpha]_D^{25}$ = −59.8° (c.=2.03 in methanol). The base regenerated from the mother liquors is enriched in the dextro-isomer.

The (−)-malate of the (−)-base is dissolved in 75 ml. of methylene chloride and shaken with 50 ml. of 10% aqueous sodium carbonate. The organic layer is separated and the aqueous layer is extracted twice with 25 ml. portions of methylene chloride. The combined organic extracts are dried over magnesium sulfate, filtered and evaporated in vacuo at 100° C. to yield colorless crystals, which on further recrystallization from isopropanol yields the free base, (−)-3-(N,N-diethylcarboxamido)-9,10-dimethoxy - 1,3,4,6,7,11b - hexahydro-[1,4]oxazino[3,4a] isoquinoline (isomer II), M.P. 133–135° C., $[\alpha]_D^{25}$ = −90.3° (c.=1.68 in methanol).

In an an analogous manner, there is obtained from (+)-malic acid and the racemic base or the partially resolved base which is enriched in (+) isomer, the (+) malate of (+)-3-(N,N-diethylcarboxamido) - 9,10 - dimethoxy - 1,3,4,6,7,11b - hexahydro-[1,4]oxazino[3,4a] isoquinoline, double M.P. 87, 91–96° C., $[\alpha]_D^{25}$=+58.6° (c.=2.09 in methanol). The corresponding free base, (+)-3-(N,N-diethylcarboxamido) - 9,10 - dimethoxy-1,3,4,6,7,11b - hexahydro - [1,4]oxazino[3,4a]isoquinoline (isomer II), after crystallization from isopropanol, demonstrates a melting point of 132.5–134° C., $[\alpha]_D^{25}$ = +90.8° (c.=1.98 in methanol).

EXAMPLE 4

| Ingredient: | Quantity/capsule, mg. |
|---|---|
| 3-N,N-diethylcarboxamido)-9,10-dimethoxy-1,3,4,6,7,11b-hexahydro-[1,4]oxazino[3,4a]isoquinoline | 100 |
| Corn starch U.S.P. | 200 |

The foregoing ingredients are mixed and introduced into a two-piece No. 1 hard gelatin capsule. Pharmaceutically acceptable salts of the active ingredient, such as the hydrochloride, may alternatively be employed.

EXAMPLE 5

| Ingredient: | Quantity/tablet, mg. |
|---|---|
| 3-(N,N-diethylcarboxamido)-9,10-dimethoxy-1,3,4,6,7,11b-hexahydro-[1,4]oxazino[3,4a]isoquinoline | 50 |
| Corn starch U.S.P. | 130 |
| Lactose | 160 |
| Cab-O-Sil M–5 colloidal silica | 4 |
| Gelatin U.S.P. | 5 |
| Magnesium stearate U.S.P. | 1 |

The foregoing ingredients are thoroughly mixed and pressed into tablets suitable for oral administration of 50 mg. of active ingredient. The tablets may be scored to permit administration of fractional doses. Pharmaceutically acceptable salts of the active ingredient, such as the hydrochloride, may alternatively be employed.

What is claimed is:

1. A pharmaceutical composition in unit dosage form comprising a pharmaceutically acceptable carrier and a tranquilizing amount of a compound selected from the group comprising an oxazinoisoquinoline of the formula:

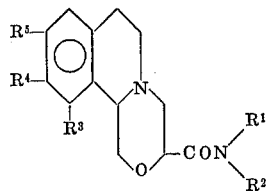

wherein:

each of $R^1$ and $R^2$ taken independently is hydrogen or (lower)alkyl or $R^1$ and $R^2$ taken together with the nitrogen atom to which they are attached are morpholino, piperidino, pyrrolidino, piperazino, N′-[(lower)alkyl]piperazino, N′ - [hydroxy(lower)alkyl]piperazino, or N′-[(lower)alkoxy(lower)alkyl]piperazino;

$R^3$ is hydrogen or (lower)alkoxy; and each of $R^4$ and $R^5$ taken independently is (lower)alkoxy or $R^4$ and $R^5$ tkane together when $R^3$ is hydrogen, are methylenedioxy; and a pharmaceutically acceptable acid addition salt thereof.

2. A composition according to claim 1 wherein said compound each of $R^1$ and $R^2$ is hydrogen or (lower) alkyl of from 1 to 3 carbon atoms or $R^1$ and $R^2$ taken together with the nitrogen atom to which they are attached are piperidino, morpholino, pyrrolidino, piperazino, N′-methylpiperazino or N′-(2-hydroxyethyl)piperazino; $R^3$ is hydrogen or methoxy; and each of $R^4$ and $R^5$ taken independently is methoxy or taken together when $R^3$ is hydrogen are methylenedioxy.

3. A composition according to claim 2 where in said compound $R^1$ and $R^2$ is (lower)alkyl of from 1 to 3 carbon atoms.

4. A composition according to claim 1 where said compound is 3-(N,N-diethylcarboxamido)-9,10 - dimethoxy - 1,3,4,7,11b - hexahydro - [1,4]oxazino[3,4a]isoquinoline, or a pharmaceutically acceptable acid addition salt thereof.

5. A composition according to claim 1 where said compound is 3 - piperidinocarbonyl-9,10-dimethoxy-1,3,4,6,7,11b - hexahydro - [1,4]oxazino[3,4a]isoquinoline, or a pharmaceutically acceptable acid addition salt thereof.

6. A composition according to claim 1 where said compound is 3-morpholinocarbonyl-9,10-dimethoxy-1,3,4,6,7,11b - hexahydro - [1,4]oxazino[3,4a]isoquinoline, or a pharmaceutically acceptable acid addition salt thereof.

7. A composition according to claim 1 where said compound is 3-pyrrolidinocarbonyl-9,10-dimethoxy-1,3,4,6,7,11b - hexahydro - [1,4]oxazino[3,4a]isoquinoline, or a pharmaceutically acceptable acid addition salt thereof.

8. A composition according to claim 1 where said compound is 3-(N′-methylpiperazinocarbonyl)-9,10-dimethoxy - 1,3,4,6,7,11b - hexahydro - [1,4]oxazino[3,4a]isoquinoline, or a pharmaceutically acceptable acid addition salt thereof.

9. A composition according to claim 1 where said compound is 3-(N-ethylcarboxamido)-9,10-dimethoxy-1,3,4,6,7,11b - hexahydro - [1,4]oxazino[3,4a]isoquinoline, or a pharmaceutically acceptable acid addition salt thereof.

10. A composition according to claim 1 where said compound is 3-piperazinocarbonyl-9,10-dimethoxy-1,3,4,6,7,11b - hexahydro - [1,4]oxazino[3,4a]isoquinoline, or a pharmaceutically acceptable acid addition salt thereof.

11. A composition according to claim 1 where said compound is 3-[N′-(2-hydroxyetryl)piperazinocarbonyl]-9,10 - dimethoxy - 1,3,4,6,7,11b-hexahydro - [1,4]oxazino[3,4a]isoquinoline, or a pharmaceutically acceptable acid addition salt thereof.

12. A composition according to claim 1 where said compound is 3-(N,N-diethylcarboxamido) - 9,10-methylenedioxy - 1,3,4,1,11b - hexahydro[1,4]oxazino[3,4a]isoquinoline, or a pharmaceutically acceptable acid addition salt thereof.

13. A composition according to claim 1 where said compound is 3 - (N,N - diethylcarboxamido)-9,10,11-trimethoxy - 1,3,4,6,7,11b-hexahydro-[1,4]oxazino[3,4a]isoquinoline, or a pharmaceutically acceptable acid addition salt thereof.

14. A composition according to claim 1 where said compound is 3 - carboxamido - 9,10 - dimethoxy-1,3,4,6,7,11b - hexahydro - [1,4]oxazino[3,4a]isoquinoline, or a pharmaceutically acceptable acid addition salt thereof.

15. A composition according to claim 1 where said compound is 3-carboxamido-9,10,11-trimethoxy-1,3,4,6,7,11b - hexahydro - [1,4]oxazino[3,4a]isoquinoline, or a pharmaceutically acceptable acid addition salt thereof.

16. A composition according to claim 1 where said compound is 3-carboxamido-9,10-methylenedioxy-1,3,4,6, 7,11b-hexahydro-[1,4]oxazino[3,4a]isoquinoline, or a pharmaceutically acceptable acid addition salt thereof.

17. A composition according to claim 1 where said compound is trans 3-(N,N-diethylcarboxamido)-9,10-dimethoxy-1,3,4,6,7,11b-hexahydro-[1,4]oxazino[3,4a]isoquinoline, or a pharmaceutically acceptable acid addition salt thereof.

18. A composition according to claim 17 where said compound is the hydrochloride salt.

19. The method of effecting transquilization in an animal which comprises administering thereto a tranquilizing amount of a compound of the formula:

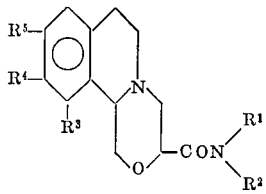

wherein:

each of $R^1$ and $R^2$ taken independently is hydrogen or (lower)alkyl or $R^1$ and $R^2$ taken together with the nitrogen atom to which they are attached are morpholino, piperidino, pyrrolidino, piperazino, N'-[(lower)alkyl]piperazino, N'-[hydroxy(lower)alkyl]piperazino, or N'-[(lower)alkoxy(lower)alkyl]piperazino;

$R^3$ is hydrogen or (lower)alkoxy; and each of $R^4$ and $R^5$ taken independently is (lower)alkoxy or $R^4$ and $R^5$ taken together when $R^3$ is hydrogen, are methylenedioxy; or a pharmaceutically acceptable acid addition salt thereof.

20. The method according to claim 19 wherein from 5 to 75 mg./kg. of body weight of trans 3-(N,N-diethylcarboxamido)-9,10-dimethyl-1,3,4,6,7,11b-hexahydro-[1,4]oxazino[3,4a]isoquinoline or a pharmaceutically acceptable acid addition salt thereof is administered.

21. The method according to claim 20 wherein said salt is the hydrochloride.

References Cited

UNITED STATES PATENTS

| | | | |
|---|---|---|---|
| 2,286,390 | 6/1942 | Sparks | 260—268 |
| 2,906,777 | 9/1959 | Denss et al. | 260—557 |
| 2,948,754 | 8/1960 | Litvan et al. | 260—247.7 |
| 3,051,710 | 8/1962 | Biel | 260—268 |
| 3,052,680 | 9/1962 | Dupuy et al. | 260—247.7 |
| 3,244,701 | 4/1966 | Jürgens et al. | 260—268 |
| 3,246,975 | 4/1966 | Hopkins | 260—247.7 |

STANLEY J. FRIEDMAN, Primary Examiner

U.S. Cl. X.R.

424—258

PO-1050
(5/69)

UNITED STATES PATENT OFFICE
CERTIFICATE OF CORRECTION

Patent No. 3,551,565      Dated December 29, 1970

Inventor(s) Frank H. Clarke Jr.

It is certified that error appears in the above-identified patent and that said Letters Patent are hereby corrected as shown below:

In Column 6:

Claim 4, line 22, instead of "1,3,4,7,11b" should appear -- 1,3,4,6,7,11b --

Claim 11, line 51, "2-hydroxyetryl" should be -- 2-hydroxyethyl --

Claim 12, line 57 should appear as -- 1,3,4,6,7,11b-hexahydro[1,4]oxazino[3,4a]iso- --

In Column 7:

Claim 19, line 10, "transquilization" should be -- tranquilization --

Signed and sealed this 13th day of April 1971.

(SEAL)
Attest:

EDWARD M. FLETCHER, JR.
Attesting Officer

WILLIAM E. SCHUYLER, JR.
Commissioner of Patents